United States Patent [19]

Evans

[11] Patent Number: 5,639,986
[45] Date of Patent: Jun. 17, 1997

[54] AIRBAG IGNITER AND METHOD OF MANUFACTURE

[75] Inventor: John Harold Evans, Landsdale, Pa.

[73] Assignee: ICI Americas Inc.

[21] Appl. No.: 477,309

[22] Filed: Jun. 6, 1995

Related U.S. Application Data

[63] Continuation of Ser. No. 154,919, Nov. 18, 1993, abandoned.

[51] Int. Cl.⁶ .................. C06D 5/00; F42B 3/18
[52] U.S. Cl. .................. 102/531; 102/202.1; 102/202.2; 102/202.7; 102/202.9; 102/202.14; 280/741; 422/166
[58] Field of Search .............. 102/202.1, 202.2, 102/202.5, 202.7, 202.9, 202.14, 530, 531, 202.3, 202.8; 280/741; 422/166

[56] References Cited

U.S. PATENT DOCUMENTS

| | | |
|---|---|---|
| 2,377,804 | 6/1945 | Narvarte ............ 102/202.2 |
| 2,408,125 | 9/1946 | Ralfes ............... 102/202.2 |
| 3,181,464 | 5/1965 | Parker et al. ........ 102/202.7 |
| 3,971,320 | 7/1976 | Lee .................. 102/202.9 |
| 4,271,453 | 6/1981 | Yajima et al. ....... 102/202.9 |
| 4,422,381 | 12/1983 | Barrett ............. 102/202.2 |
| 4,441,427 | 4/1984 | Barrett ............. 102/202.2 |
| 4,734,426 | 3/1988 | Nilsson et al. ...... 280/741 |
| 4,745,858 | 5/1988 | Harder .............. 102/202.2 |
| 4,819,560 | 4/1989 | Patz et al. ......... 102/202.5 |
| 4,890,860 | 1/1990 | Schneiter ........... 280/741 |
| 5,153,368 | 10/1992 | Fogle, Jr. .......... 102/202.2 |
| 5,273,722 | 12/1993 | Hoginauer et al. .... 280/741 |
| 5,286,054 | 2/1994 | Cuevas .............. 280/741 |

FOREIGN PATENT DOCUMENTS

| | | | |
|---|---|---|---|
| 269475 | 6/1988 | European Pat. Off. | 102/202.2 |
| 2281608 | 3/1995 | United Kingdom . | |

*Primary Examiner*—Harold J. Tudor

[57] ABSTRACT

The present invention is directed to an improved igniter for airbags wherein the igniter is combined with an airbag assembly fixedly making metal-to-metal communication.

8 Claims, 2 Drawing Sheets

AIRBAG IGNITER AND METHOD OF MANUFACTURE

This is a divisional of application Ser. No. 08/154,919 filed Nov. 18, 1993, now abandoned.

The present invention is directed to an improved igniter for use in airbag inflator assemblies.

The airbag inflator assembly art employs the use of pyrotechnic materials for the release of gas at or very near the moment of impact of an automobile accident to timely inflate an airbag with gas. The filled airbag then protects the occupants of the car from substantial harm by providing a cushion to absorb the energy of the momentum transfer.

Those skilled in this art appreciate that in order to achieve the timely filling of an airbag, the inflator assembly must be designed to convert electrical energy into chemical energy and do so very quickly. An important part of this assembly is the igniter or squib. The igniter is the interfacial mechanism that converts an electrical signal into heat which then activates a series of pyrotechnic materials which ultimately inflate the airbag, all in a matter of milliseconds. The igniter must be reliable and must integrate into the greater assembly unit, bearing in mind the ease of manufacture.

A problem in this art is interfacing the igniter into the greater airbag assembly. In order for an igniter to be accepted by the automobile manufacturing industry for the purpose of airbag assembly, the igniter must be able to provide insulation resistance and protection against electrostatic discharges. A failure in either of these characteristics of the igniter results in a commercially failed igniter. A potential consequence of that failure, as well, could result in great harm to the occupants within the automobile.

Due to some of the electrical requirements companion to the use of pyrotechnics, an igniter must be designed with certain redundancies built in to insure against accidental misfiring. Should the design not protect against electrostatic discharge or provide certain insulation resistance, such misfires may occur. Grounding the electrical components and insuring that the pyrotechnics do not fire due to a build-up of electrostatic charges are, therefore, important.

In prior devices, such as that described in U.S. Pat. No. 3,971,320, incorporated herein by reference in its entirety, the grounding was accomplished through a grounding shunt from a coaxial lead to the housing of the igniter. These prior art devices found it necessary to use the igniter housing as a grounding mechanism since it was convenient and operable. While facilitating the required grounding, the use of the housing as a grounding means required the use of an insulating encapsulant on portions of the igniter to avoid metal-to-metal communication between the igniter and the greater airbag assembly. Such communication needed to be avoided since an electrical signal could be errantly received from the airbag assembly, potentially causing a misfire of the igniter. The use of an encapsulant material, usually a plastic, polymeric, or insulating material, creates manufacturing problems, provides a poor mating relationship between igniter and airbag assembly, decreases the mechanical utility of the glass-to-metal seal to the overall assembly, and creates difficulties for autoignition.

The glass-to-metal seal is a mechanically strong seal which is made comprising a number of geometries such as coaxial wire, a glass and/or ceramic material, and the igniter housing. The seal itself actually becomes part of the composite structure adding strength and mechanical integrity to the igniter. Autoignition is defined as the complete firing of the pyrotechnics in the igniter, if any of the pyrotechnics fire at all. This is an important feature for an igniter since partial firing creates a safety hazard in operation during replacement of components or dismantling of the air bag assembly. An improvement in autoignition for squibs and igniters is described in U.S. Ser. No. 08/116,361, filed Sep. 3, 1993 the disclosure of which is incorporated herein by reference as filed.

The present invention preserves insulation resistance and protects against electrostatic discharges while facilitating autoignition, providing an improved integration of igniter into the airbag assembly, utilizing with fuller effect the mechanical integrity and strength of the glass-to-metal seal, and providing an igniter that is easier to manufacture. The igniter of the present invention is found useful as an initiation means for the timely inflation of airbags with gas or other safety restraint systems such as seatbelt tensioners.

FIGURES

SUMMARY OF THE INVENTION

Figure 1:
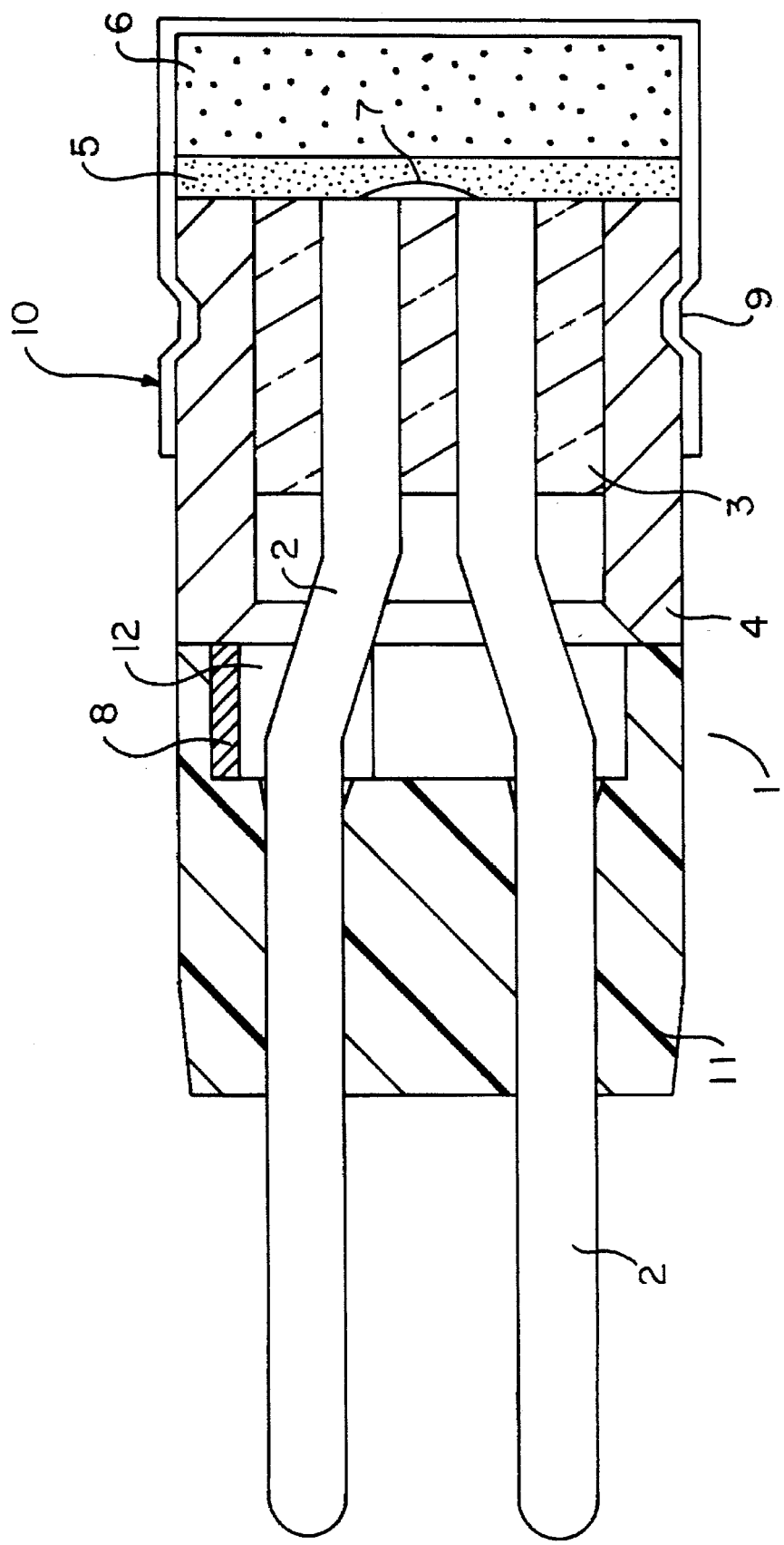
FIG. 1 is a cross-section of the inventive igniter.

An igniter for airbags comprising a means for insulation resistance and a means for controlling a single or plurality of electrostatic discharges wherein said igniter housing is in metal-to-metal communication with an airbag assembly. The housing is defined as the outer structural periphery of the igniter which encapsulates the pyrotechnics, the twin-axial wires, the glass-to-metal seal and the bridging mechanism. The housing is comprised of metal, preferably a combination of transition metals or alloys thereof, most preferably copper and copper alloys for the cup and steel and steel alloys for the header and/or cup.

As is common in any electrical system, an electrostatic charge may build-up in any one area of the igniter. If such a charge builds to a certain threshold, it may cause an electrostatic discharge. The discharge in the vicinity of a pyrotechnic material may cause the material to fire arbitrarily. To avoid an arbitrary or untimely firing, the igniter provides a means to release by a controlled means the electrostatic charge build-up in a harmless manner. This may be accomplished by providing a gap, smaller than and preferably at least three to four times smaller than the gap or space between the twin-axial wire closest to the housing and the housing of the igniter. By providing a smaller gap internal to the igniter, the present invention takes advantage of the fact that electricity will follow the path of least resistance. In the present invention, the electrostatic discharge gap is positioned away from the pyrotechnic material. The criticality of the positioning is determined by the proximity of a potential discharge to the pyrotechnic material. Simply, the gap may be provided so that no electrostatic discharge will flow through any pyrotechnic material. The preferred embodiment for the present invention is to position the discharge gap outside of the pyrotechnic cup on the opposing side of said cup glass-to-metal seal, as described hereinbelow.

The insulation resistance is tested by charging the igniter with approximately 500 volts. The test leads are appended to the twin-axial wire and the housing, the system subsequently charged. The resistance should be no less than about 100 megohms.

In its most general aspect, the igniter of the present invention comprises the use of pyrotechnics, more specifically, the use of two pyrotechnics. The primary pyrotechnics are perchlorate materials. These materials comprise zirconium/potassium perchlorate, titanium/potassium perchlorate, titanium/boron/potassium perchlorate, and boron/potassium perchlorate, to name a few. Approximately 110 to 1000 milligrams of primary pyrotechnic are used, either as a single species or as some combination. A mixture of titanium/zirconium potassium perchlorate in stoichiometric amounts may be used. A zirconium/potassium perchlorate mass of about 150 milligrams or a titanium/potassium perchlorate charge of about 130 milligrams are preferred loadings. Generally, the primary pyrotechnic initiates the gas producing pyrotechnic of the airbag assembly, such as sodium azide, either directly or via an enhancer or booster charge.

The secondary pyrotechnics are the styphnate compounds such as lead and/or barium styphnate and combinations thereof. About 40 milligrams of the styphnate compound is used. The operative requirement for the styphnate compound is that this pyrotechnic intimately communicates with the bridging wire. The styphnate compound is sensitive to hot wire ignition and reacts to produce and transfer heat very quickly which enables the perchlorate pyrotechnic to transfer sufficient energy to the gas generating pyrotechnic. An additional benefit to the secondary pyrotechnic is its electrical properties, such as electrical resistance, which aids in the overall performance of the igniter. Such characteristics would be important in any pyrotechnic whether used as a multiple or unipyrotechnic charge.

The wire leads are twin-axial. There are usually two such axial leads, therefore named twin-axial. The cup end of these twin-axial leads are immobilized by encasement in glass and/or ceramic material. At the cup end, portions of the twin-axial leads protrude through the glass-to-metal seal. A bridge wire is made to communicate with the two leads, with an end of the bridge wire affixed to each twin-axial wire. When the igniter is activated, electrically, the bridge wire heats up much like an incandescent light bulb or ohmically heated, which then transfers heat to the styphnate compound which ignites and subsequently transfers this energy to the gas generating azide.

A particular advantage to the present inventive igniter is the reduced requirement for an insulating material to encapsulate the metal housing. This is significant for a variety of reasons. Firstly, by removing or minimizing this requirement, the manufacturing process becomes much easier. There is no need to encapsulate the metal cup with an insular material, therefore a major manufacturing step may be omitted. Secondly, there is no requirement for affixing the insulation. It is found in present igniters that the insulation provides a mode of failure, partly due to the use of dissimilar material and partly due to the affixation difficulties. Igniters may, then, fail due to a poor igniter airbag assembly sealed interface. By partial or total removal of the insulation material, a metal-to-metal communication is provided between igniter and airbag assembly. Those skilled in this art will readily realize that a sealed assembly will have much greater mechanical and thermal intimacy with a metal-to-metal mating rather than a metal-to-plastic-to-metal mating. An additional sealant may be added to insure a strong union between igniter and airbag assembly.

Thirdly, the omission of the insulating cup allows the airbag assembly to take greater advantage of the glass-to-metal seal. The glass-to-metal seal provides an electrical signal feed through as well as excellent mechanical integrity for the igniter assembly. After careful mating of materials it is found that slagging or meltably forming the glass, ceramic, or glass-ceramic material to the twin-axial wires and inside housing provides a structure, known as a header, which is capable of withstanding great pressures, anywhere from 40 to 60 thousand pounds per square inch and moderate temperature variations from about −40 to 100 degrees centigrade without destroying the integrity of the seal. Whereas in prior igniter/airbag assemblies this structural integrity was compromised by the insulating cup, removal of said insulating cup releases the structural integrity of the glass-to-metal sealed igniter to flow to the entire igniter/airbag assembly interface. Metal-to-metal interfaces are easier to bond with higher strength than dissimilar materials. The metal-to-metal interfaces reduce by half the number of interfaces that need to be bound. Since both pieces are metal, the work pieces can be mateably machined. Electrical conductivities as well as thermal conductivities and expansions are also similar.

The glass in the glass-to-metal seal may be comprised of, to name a few, silicates, aluminates, borates, quartz, and combinations thereof and therebetween, ceramic materials such as borides, nitrides, titanates, aluminides, silicides, and combinations of composites or species from the Periodic Chart, and glass-ceramic materials wherein for example a silicate material may be seeded with a ceramic material by up to 5 weight percent ceramic.

Finally, another added advantage of omitting the plastic encapsulate is the capability for autoignition. A problem in this art is to provide an igniter wherein the pyrotechnic material therewithin totally ignites when requested to operate, either purposefully or accidentally. The plastic housing interface between the igniter and airbag assembly unit inhibits the transfer of heat from the airbag assembly unit to the igniter in the event that the airbag assembly fires first. Should such an event occur it is difficult to determine, after the fact, if the igniter pyrotechnics have fired as well as the airbag assembly pyrotechnic. This could create a dangerous occurrence since someone must disassemble the unit once some part of it has fired. The disassembler would have no indication of igniter ignition until disassembly was started. Removal of the plastic cup provides a better heat transfer thus facilitating autoignition and avoiding this hazard.

In the method of manufacture of the igniter, the header is assembled, as stated hereinabove, wherein the coaxial wires, bridge wire and housing are mated with a glass-to-metal seal. The primary pyrotechnic is loaded into a metal cup, pressing this primary pyrotechnic into the cup bottom at about 5000 pounds per square inch. Next the secondary pyrotechnic is pressed into the cup juxtaposed to the primary pyrotechnic at approximately 2000 pounds per square inch. Finally, the assembled header is inserted into the cup, pressed at 5000 pounds per square inch and contemporaneously crimped, metal against metal, into place wherein the cup is in overlapping communication and fixedly crimped against the header creating the assembled housing.

FIG. 1 shows the features of the inventive igniter. The igniter, 1, comprises the twin-axial wires, 2, glass-to-metal seal, 3, bridge wire, 7, and metal housing, 4, which together make the referenced header. Bridge wire, 7, extends into the secondary pyrotechnic area, 5, and is in intimate communication with said secondary pyrotechnic. The cup, 10, provides for the primary pyrotechnic in the area designated 6 which contains the primary pyrotechnic wherein said primary pyrotechnic is in communication with a secondary pyrotechnic which occupies the space designated 5. While areas 5 and 6 are shown with a flat interface, the interface may be curved with the concave portion central to the cup insuring that the bridge wire is emersed in the secondary pyrotechnic and optionally distanced from the primary pyrotechnic. The electrostatic discharge element, 8, is positioned away from the pyrotechnic materials. Element 8 is usually made of the same material, a metal, as the housing, 4, and placed proximate to the twin-axial wire, 2 at a smaller gap than the distance between the twin-axial wire, 2, and said housing 4.

After the primary and secondary pyrotechnic materials are added to the cup, the header is then pressed into said cup with crimp, 9, perpendicularly pressed into the side of the igniter housing to fix said cup to said header. Finally, a molded insulating material, 11, is positioned to seal the exposed twin-axial wired end of the igniter assembly and to position the twin-axial wires relative to the electrostatic discharge element. The materials used to form element 11 are well known in the art as disclosed in U.S. Pat. No. 3,971,320. Gap, 12, is the spark gap area wherein any electrostatic charge is preferably discharged. Gap, 12, is preferably placed outside of the effective area of the pyrotechnic material where a spark may ignite said pyrotechnic material. The gap, 12, is most preferably positioned as shown in FIG. 1 on the opposite side of the glass-to-metal seal from said cup, 10 and residing in said housing.

Figure 2:
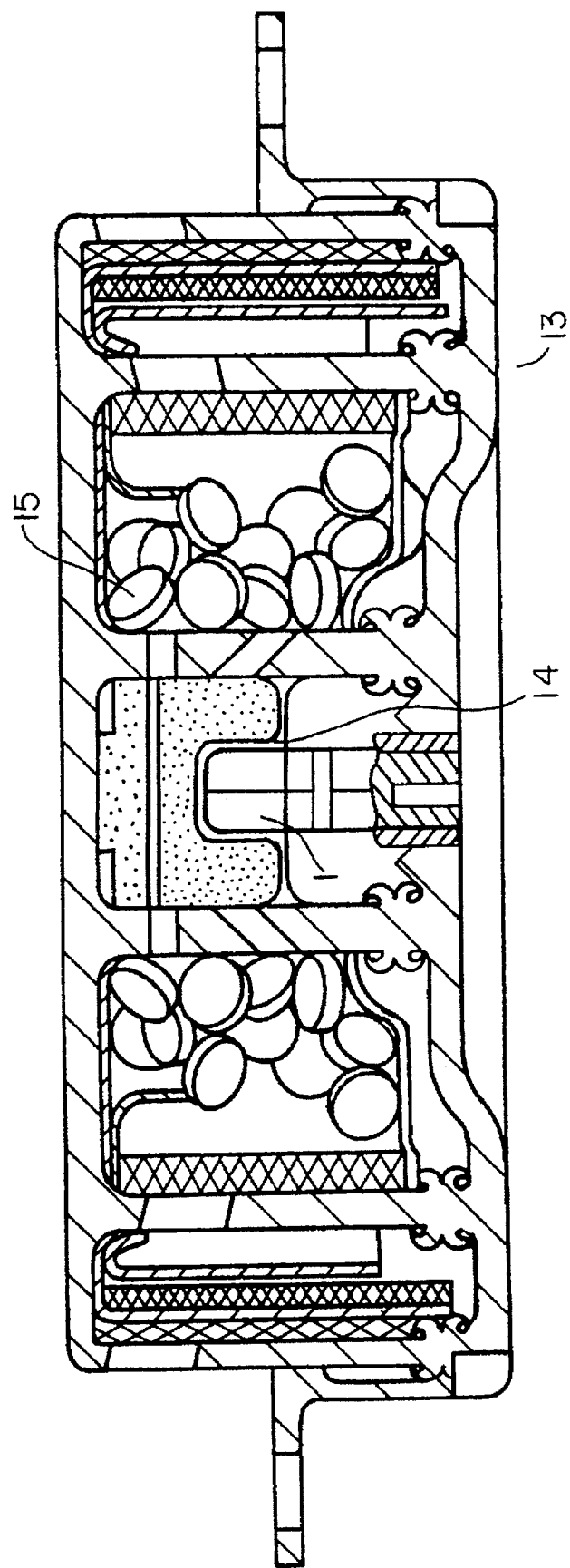
FIG. 2 shows a cross-section of the airbag assembly showing the placement of the inventive igniter.

FIG. 2 shows an airbag assembly, 13, with an installed igniter, 1. The interface between the airbag assembly unit and igniter 1 is shown at 14. The gas generating pellets, 15, are shown proximate to the igniter, 1.

The several interfaces in the assembly unit can be sealed by a variety of means known by those skilled in this art. Soldering, welding and/or sealing with polymers such as epoxies and anaerobic acrylates are a few examples. Sealing is important due the pressures experienced on the separately made components and to protect the pyrotechnics and working mechanisms from environmental intrusions such as water and/or moisture vapor. Sealing means are disclosed in U.S. Ser. No. 08/075,183 filed Jun. 10, 1993 incorporated herein by reference.

I claim:

1. An igniter comprising:
   (a) a metal housing having a first open end and a second open end,
   (b) a metal cup containing a pyrotechnic charge attached solely to a forward portion of said housing adjacent the first open end,
   (c) twin axial wires extending through the second end of the housing and in contact with the pyrotechnic charge at the first end,
   (d) a bridge wire affixed to each of the twin axial wires, said bridge wire contacting said pyrotechnic charge,
   (e) said twin axial wires being held in place within the housing by a glass to metal seal, and
   (f) a body of insulating material attached to the second open end of the housing and having an open cavity adjacent said housing, said twin axial wires extending through said body and said open cavity, a metal element within said cavity and in contact with the second open end of the housing, at least one of said twin axial wires being bent towards said metal element, said metal element controlling electrostatic discharges said metal element positioned away from the pyrotechnic material and forming a discharge gap defined by the distance between said at least one bent twin axial wire and the metal element, said discharge gap being smaller than a gap between the twin axial wires and the housing in the area adjacent to the pyrotechnic material.

2. An igniter, as claimed in claim 1, wherein the discharge gap is at least three times smaller than the gap between the twin axial wires and the housing in the area adjacent to the pyrotechnic charge.

3. An igniter, as claimed in claim 1, wherein the discharge gap is at least four times smaller than the gap between the twin axial wires and the housing in the area adjacent to the pyrotechnic charge.

4. An igniter, as claimed in claim 1, wherein the pyrotechnic charge comprises a primary pyrotechnic charge in communication with a secondary pyrotechnic charge.

5. An igniter, as claimed in claim 4, wherein the secondary pyrotechnic charge is in contact with the bridge wire.

6. An igniter, as claimed in claim 4, wherein the secondary pyrotechnic charge is a styphnate compound.

7. An igniter, as claimed in claim 4, wherein the primary pyrotechnic charge is a perchlorate mixture.

8. An air bag assembly comprising (a) an igniter as claimed in claim 1, in metal to metal contact with (b) an airbag assembly unit.

* * * * *